(12) United States Patent
Kinoshita et al.

(10) Patent No.: US 8,770,325 B2
(45) Date of Patent: Jul. 8, 2014

(54) BULLDOZER

(75) Inventors: Souichirou Kinoshita, Sao Paulo (BR);
Akira Kotani, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/883,135

(22) PCT Filed: Sep. 4, 2012

(86) PCT No.: PCT/JP2012/072464
§ 371 (c)(1),
(2), (4) Date: May 2, 2013

(87) PCT Pub. No.: WO2014/024323
PCT Pub. Date: Feb. 13, 2014

(65) Prior Publication Data
US 2014/0041953 A1    Feb. 13, 2014

(30) Foreign Application Priority Data

Aug. 10, 2012  (JP) .................................. 2012-177671

(51) Int. Cl.
*B60K 25/00* (2006.01)
*B60K 25/08* (2006.01)

(52) U.S. Cl.
USPC ... 180/53.4; 180/53.6; 180/53.61; 180/53.62; 60/317

(58) Field of Classification Search
USPC ............ 180/53.4, 53.6, 53.61, 53.62; 60/311, 60/317, 320
See application file for complete search history.

(56) References Cited

U.S. PATENT DOCUMENTS

| 4,270,695 | A * | 6/1981 | Carson ......................... 237/12.1 |
| 6,550,448 | B1 * | 4/2003 | Isogawa et al. ............... 123/336 |
| 6,557,533 | B2 * | 5/2003 | Katayama et al. ............ 123/516 |
| 2002/0040706 | A1 * | 4/2002 | Katayama et al. ............ 123/516 |
| 2008/0127932 | A1 * | 6/2008 | Bailey ......................... 123/27 GE |
| 2012/0102932 | A1 * | 5/2012 | Mitsuda ......................... 60/311 |
| 2012/0227389 | A1 * | 9/2012 | Hinderks ......................... 60/317 |
| 2013/0291529 | A1 * | 11/2013 | Stahlkopf et al. ............... 60/370 |
| 2014/0060954 | A1 * | 3/2014 | Smith et al. .................... 180/273 |
| 2014/0067215 | A1 * | 3/2014 | Wetterlund et al. ............. 701/69 |

FOREIGN PATENT DOCUMENTS

| CN | 1556286 A | 12/2004 |
| JP | 8-42351 A | 2/1996 |
| JP | 2003-127685 A | 5/2003 |
| JP | 2006-274596 A | 10/2006 |
| JP | 2009-197694 A | 9/2009 |
| JP | 2011-140932 A | 7/2011 |
| JP | 2011-196117 A | 10/2011 |

* cited by examiner

Primary Examiner — Toan To
(74) Attorney, Agent, or Firm — Global IP Counselors, LLP

(57) ABSTRACT

A bulldozer is provided with an engine, a pump assembly, an engine auxiliary, and a connecting member. The engine has an output axis which extends in a front and back direction of the bulldozer. The pump assembly includes a plurality of hydraulic pumps. The hydraulic pumps are disposed behind the engine and are disposed to line up with each other in the front and back direction. The pump assembly is connected to the engine. The engine auxiliary is disposed behind the engine and is mounted to the engine. The connecting member connects the engine and the engine auxiliary.

8 Claims, 9 Drawing Sheets

BULLDOZER

CROSS-REFERENCE TO RELATED APPLICATIONS

This application claims priority to Japanese Patent Application No. 2012-177671 filed on Aug. 10, 2012, the disclosure of which is hereby incorporated herein by reference in its entirety.

BACKGROUND

1. Technical Field

The present invention relates to a bulldozer.

2. Background Information

A bulldozer is provided with an engine and an engine auxiliary. The engine auxiliary is connected to the engine via a connecting member such as a pipe or a cable. For example, a bulldozer which is disclosed in Japanese Unexamined Patent Application Publication No. H08-42351 is provided with a fuel tank as the engine auxiliary.

SUMMARY

In addition, the bulldozer is provided with a pump assembly. The pump assembly is disposed behind the engine and is connected to the engine. The pump assembly has a plurality of hydraulic pumps which are disposed to line up in the front and back direction of the bulldozer. In a case where such a pump assembly is connected to the engine, the center of gravity of an engine unit which includes the engine and the pump assembly is positioned behind the center of gravity of the engine by itself. As a result, the distance between the center of gravity of the engine unit and the engine auxiliary is large in a case where the engine auxiliary is disposed in front of the engine. As a result, the burden which is applied to the connecting member is further increased.

The object of the present invention is to provide a bulldozer where it is possible to reduce the burden on a connecting member which connects an engine and a pump assembly.

A bulldozer according to a first aspect of the present invention is provided with an engine, a pump assembly, an engine auxiliary, and a connecting member. The engine has an output axis which extends in the front and back direction. The pump assembly includes a plurality of hydraulic pumps. The plurality of hydraulic pumps are disposed behind the engine and are disposed to line up with each other in the front and back direction. The pump assembly is connected to the engine. The engine auxiliary is disposed behind the engine and is mounted to the engine. The connecting member connects the engine and the engine auxiliary.

A bulldozer according to the second aspect of the present invention is the bulldozer according to the first aspect where the engine further has a flywheel. The flywheel is disposed in front of the pump assembly. The pump assembly is connected to the engine via the flywheel. The engine auxiliary is disposed above the flywheel.

A bulldozer according to the third aspect of the present invention is the bulldozer according to the second aspect where a bracket is further provided. The engine auxiliary is attached to the bracket. The bracket is disposed above the flywheel and is attached to the flywheel.

A bulldozer according to the fourth aspect of the present invention is the bulldozer according to the third aspect where a linking member is further provided. The linking member links an upper portion of the bracket and the engine.

A bulldozer according to the fifth aspect of the present invention is the bulldozer according to the third or the fourth aspect where the engine auxiliary has a fuel filter and a crank case ventilation device. The fuel filter is attached to one side portion of the bracket. The crank case ventilation device is attached to the other side portion of the bracket.

A bulldozer according to the sixth aspect of the present invention is the bulldozer according to the fifth aspect where the engine auxiliary further has an engine control unit. The engine control unit is attached to the bracket between the fuel filter and the crank case ventilation device.

A bulldozer according to the seventh aspect of the present invention is the bulldozer according to the sixth aspect where the bracket have a plate section, a first side surface section, a second side surface section, and a base surface section. The plate section extends in the up and down direction and in the left and right direction. The engine control unit is attached to the plate section. The first side surface section is linked to one side portion of the plate section. The fuel filter is attached to the first side surface section. The second side surface section is linked to the other side portion of the plate section. The crank case ventilation device is attached to the second side surface section. The base surface section is attached to the flywheel.

A bulldozer according to the eighth aspect of the present invention is the bulldozer according to any of the first to the seventh aspects where an engine cover which covers the engine is further provided. An inspection window is provided in a side surface of the engine cover. The engine auxiliary is disposed to face the inspection window.

In the bulldozer according to the first aspect of the present invention, the engine auxiliary is mounted to the engine. As a result, the engine auxiliary belongs to the same vibration system as the engine. In addition, the engine auxiliary is disposed behind the engine. As a result, the distance between the center of gravity of the engine unit which includes the engine and the pump assembly and the engine auxiliary is shorter compared with a case where the engine auxiliary is disposed in front of the engine. Due to this, it is possible to reduce the burden on the connecting member which connects the engine auxiliary and the engine.

In the bulldozer according to the second aspect of the present invention, the engine auxiliary is disposed above the flywheel. Due to this, it is possible to dispose the engine, the engine auxiliary, and the flywheel in a compact manner.

In the bulldozer according to the third aspect of the present invention, it is possible to easily realize a configuration where the engine auxiliary is disposed behind the engine and the engine auxiliary is mounted to the engine using the bracket.

In the bulldozer according to the fourth aspect of the present invention, it is possible to further reduce the burden on the connecting member using the linking member.

In the bulldozer according to the fifth aspect of the present invention, it is possible to reduce the burden on the connecting member such as the pipe which is connected to the fuel filter and the connecting member such as the pipe which is connected to the crank case ventilation device.

In the bulldozer according to the sixth aspect of the present invention, it is possible to reduce the burden on the connecting member such as a cable which is connected to the engine control unit.

In the bulldozer according to the seventh aspect of the present invention, it is possible to dispose the fuel filter, the crank case ventilation device, and the engine control unit in a compact manner using the bracket.

In the bulldozer according to the eighth aspect of the present invention, it is possible to easily access the engine auxiliary from the inspection window. Due to this, the ease of carrying out maintenance of the engine auxiliary is improved.

DETAILED DESCRIPTION OF THE EMBODIMENTS

Figure 1:
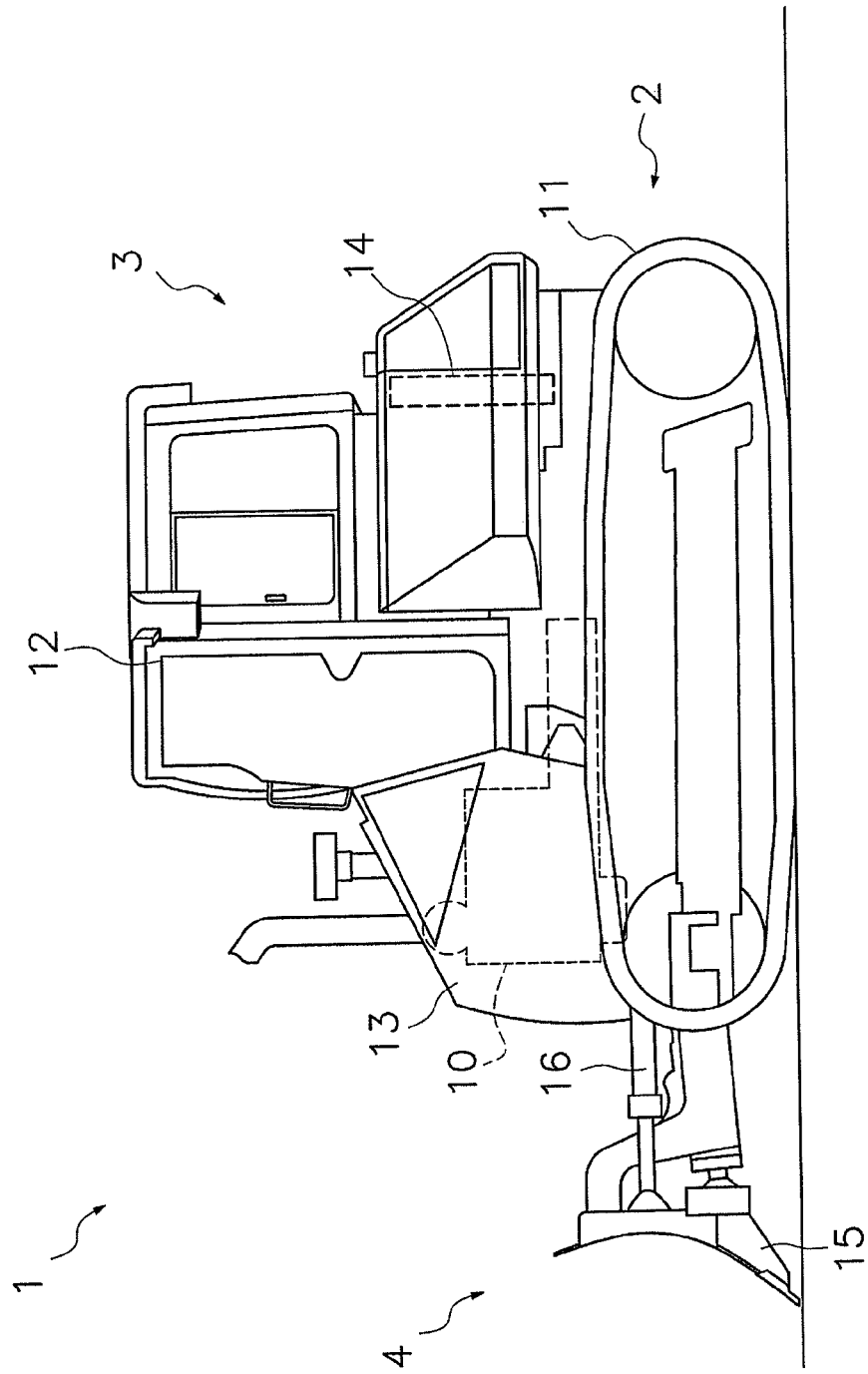
FIG. 1 is a side view of a bulldozer according to an embodiment of the present invention.

A side view of a bulldozer 1 according to an embodiment of the present invention is shown in FIG. 1. The bulldozer 1 is provided with right and left traveling devices 2, a vehicle body 3, and a work implement 4. The traveling devices 2 are devices for movement of the vehicle and have crawler tracks 11. The bulldozer 1 moves by the driving of the crawler tracks 11. Here, only the traveling device 2 which is on the left side of the right and left traveling devices is shown in FIG. 1.

The vehicle body 3 includes an engine unit 10, a cab 12, an engine cover 13, and a cooling device 14. The engine cover 13 is disposed in front of the cab 12. The upper surface of the engine cover 13 is inclined downwards with a forward inclination. The cooling device 14 is disposed behind the cab 12. The cooling device 14 includes, for example, a radiator which cools coolant in an engine 21 and the oil cooler which cools hydraulic fluid.

The work implement 4 is provided in front of the engine cover 13. The work implement 4 has a blade 15 and a hydraulic cylinder 16. The blade 15 is attached so as to be able to swing in the up and down direction. The hydraulic cylinder 16 changes the posture of the blade 15.

Figure 2:
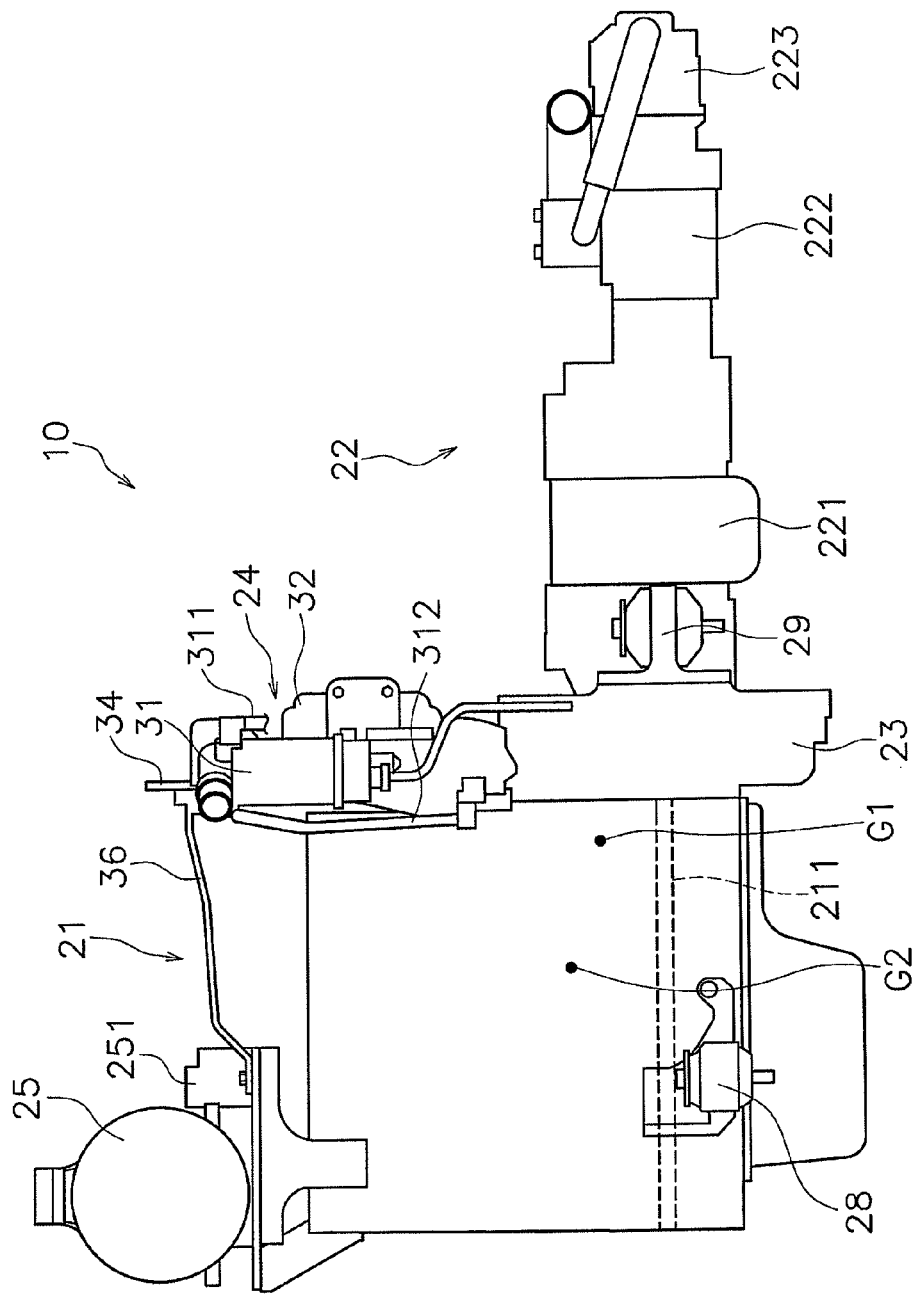
FIG. 2 is a side view of an engine unit of the bulldozer.
Figure 3:
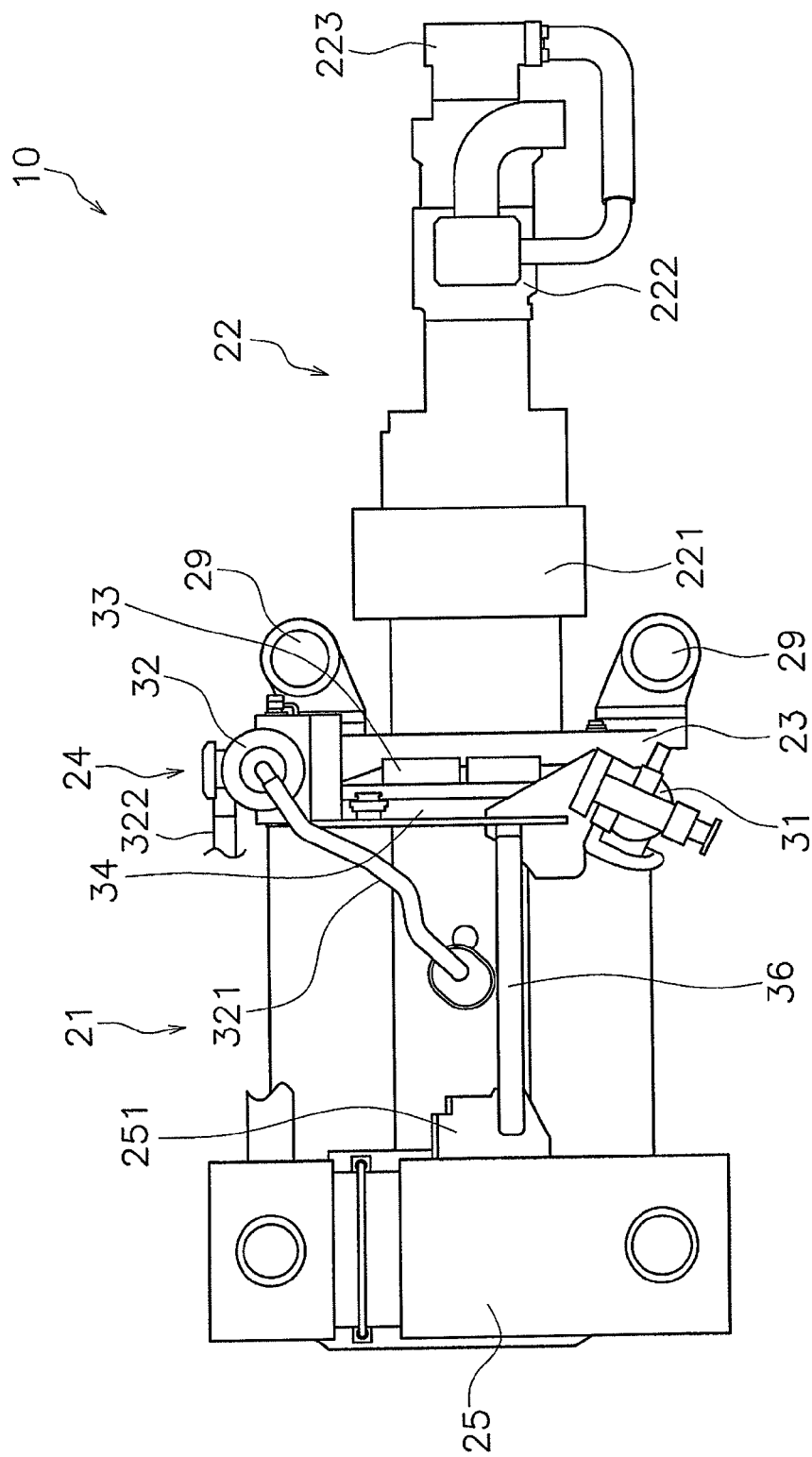
FIG. 3 is an upper view of the engine unit.

FIG. 2 is a side view of the engine unit 10. FIG. 3 is an upper view of the engine unit 10. The engine unit 10 has an engine 21, a pump assembly 22, a flywheel 23, and an engine auxiliary unit 24.

The engine 21 has an output shaft 211 which extends in the front and back direction. The engine 21 is disposed inside the engine cover 13 described above and is covered using the engine cover 13. The flywheel 23 is disposed in front of the pump assembly 22. The pump assembly 22 is connected to the engine 21 via the flywheel 23. The pump assembly 22 is disposed behind the engine 21. The pump assembly 22 includes a plurality of hydraulic pumps 221 to 223.

The hydraulic pumps 221 to 223 are driven using the engine 21. The hydraulic pumps 221 to 223 include an HST pump 221, a work implement pump 222, and a charge pump 223. The HST pump 221 drives the traveling devices 2. The work implement pump 222 drives the hydraulic cylinder 16 of the work implement 4. The charge pump 223 supplements the hydraulic fluid in the hydraulic circuit in order to drive the traveling device 2. The hydraulic pumps 221 to 223 are connected to each other to line up in the front and back direction. The flywheel 23 is disposed between the engine 21 and the pump assembly 22 in the front and back direction.

Here, a front mounting section 28 is attached to the engine 21. A rear mounting section 29 is attached to the flywheel 23.

The engine unit 10 is supported by the vehicle body frame (which is not shown in the diagram) via the front mounting section 28 and the rear mounting section 29.

Figure 4:
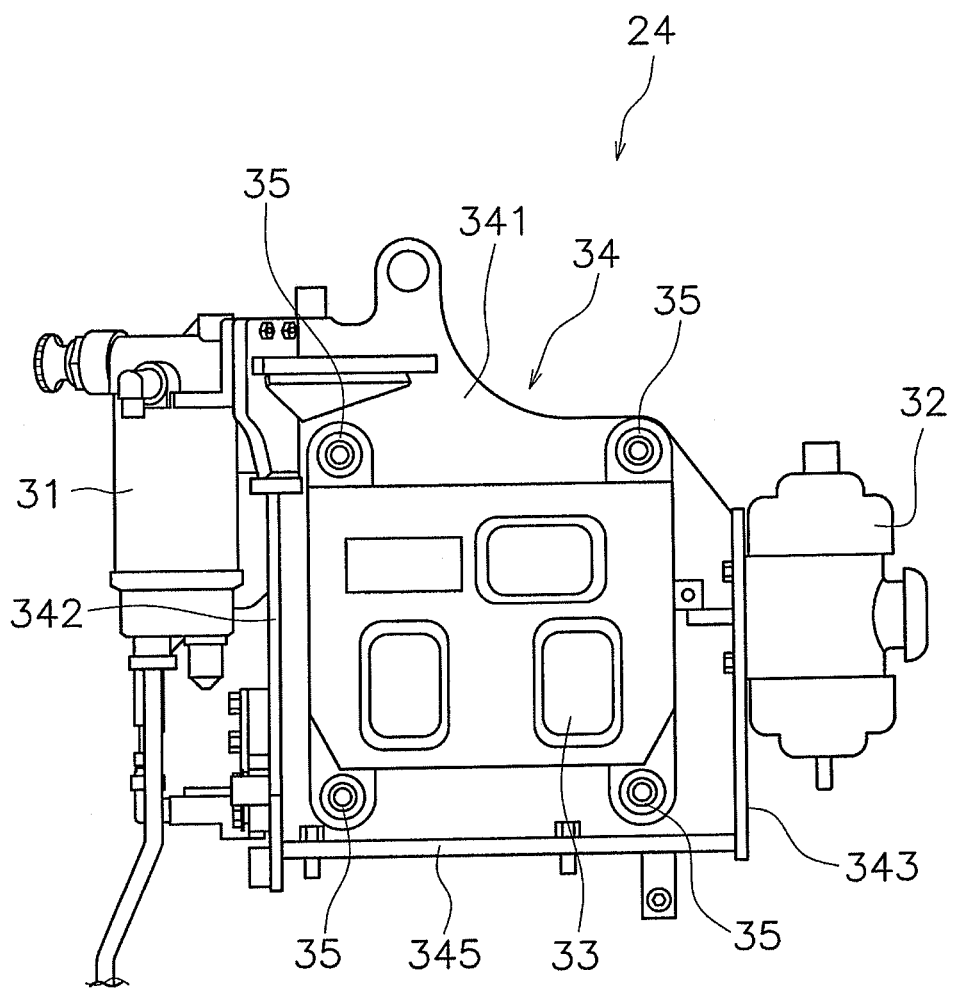
FIG. 4 is a rear view of an engine auxiliary unit.
Figure 5:
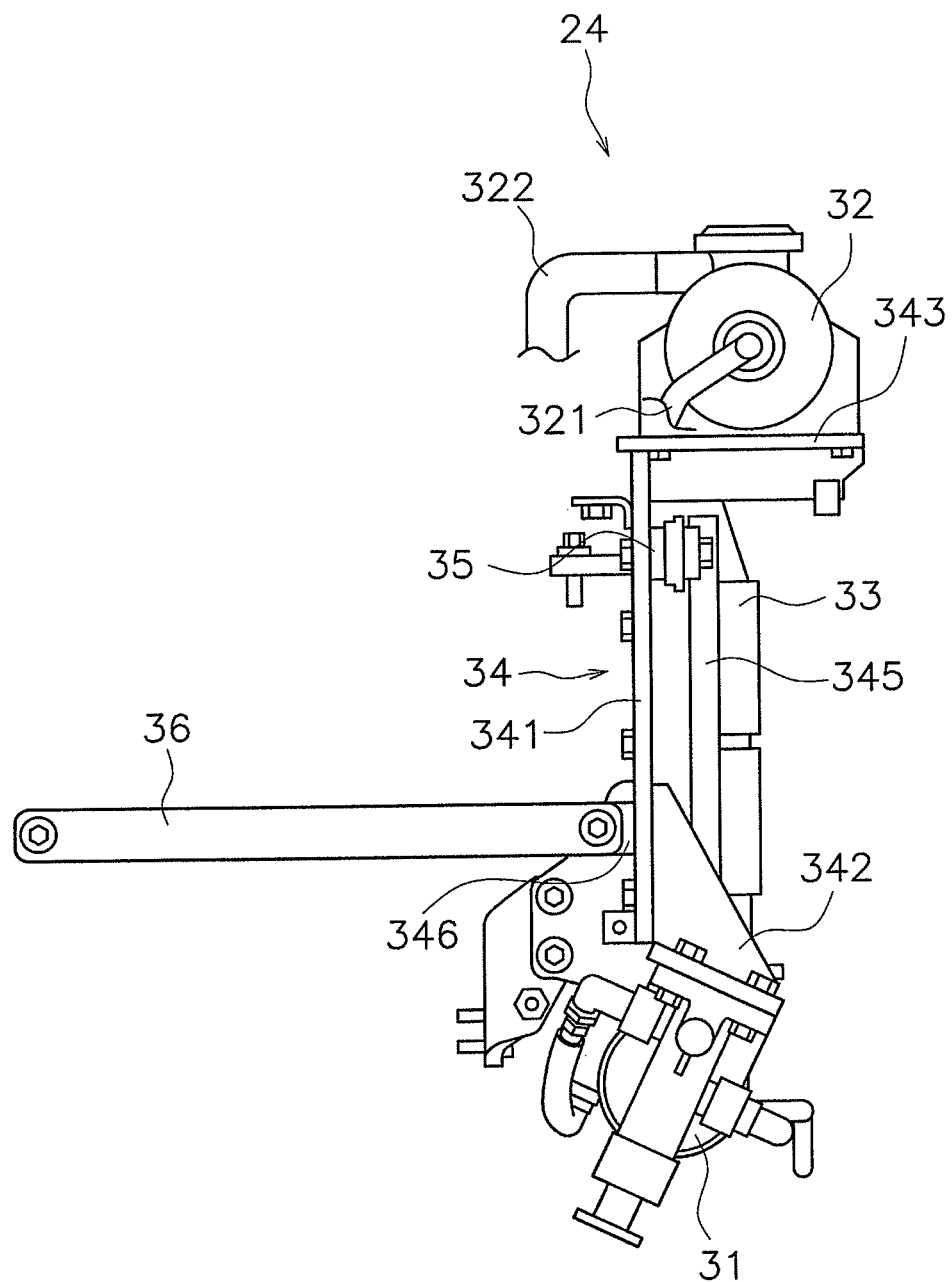
FIG. 5 is an upper view of the engine auxiliary unit.
Figure 6:
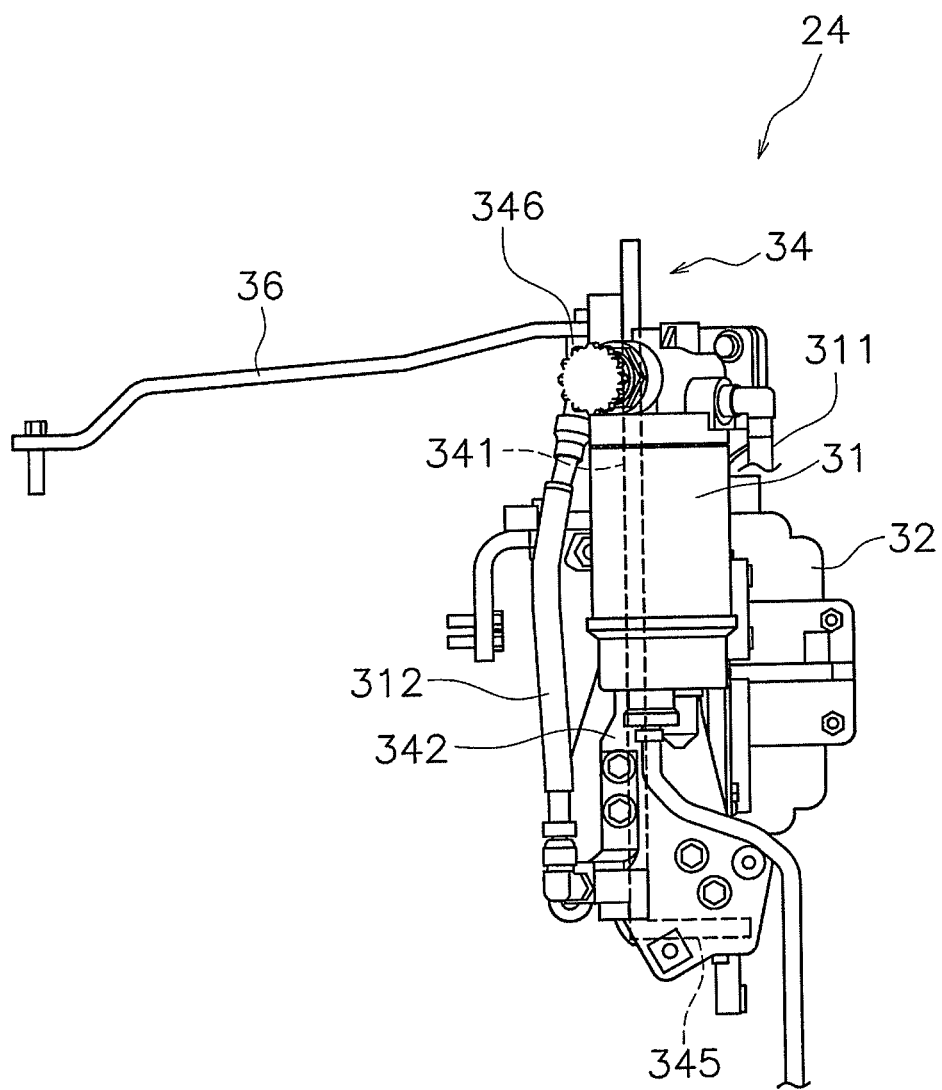
FIG. 6 is a left view of the engine auxiliary unit.
Figure 7:
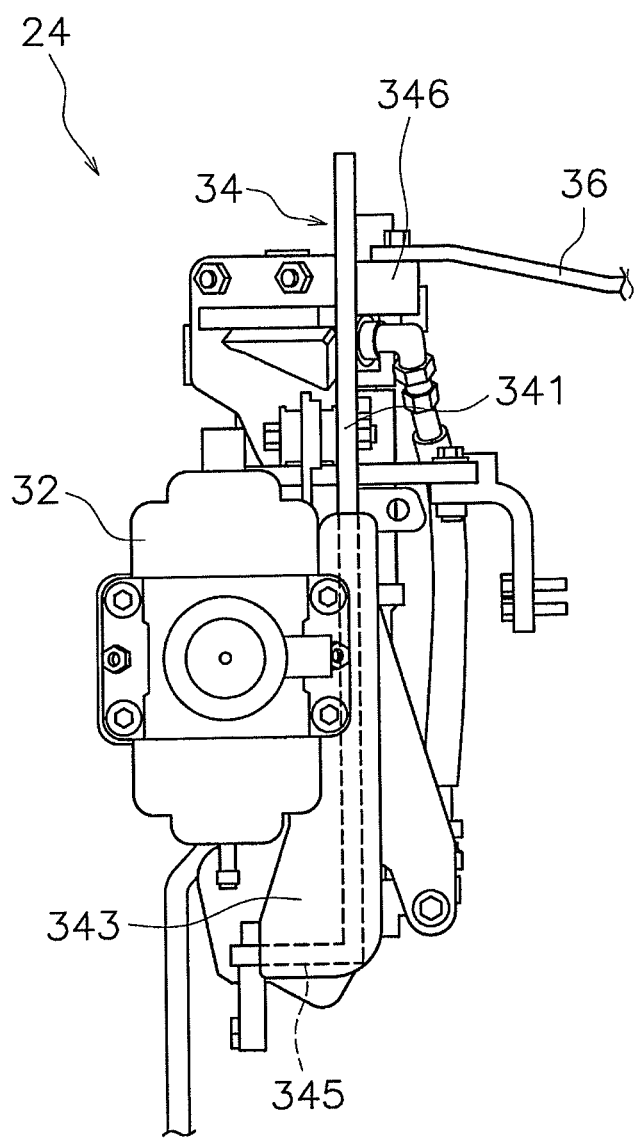
FIG. 7 is a right side view of the engine auxiliary unit.

The engine auxiliary unit 24 is disposed behind the engine 21 and is mounted to the engine 21. The engine auxiliary unit 24 is disposed above the flywheel 23. FIG. 4 is a rear view of the engine auxiliary unit 24. FIG. 5 is an upper view of the engine auxiliary unit 24. FIG. 6 is a left side view of the engine auxiliary unit 24. FIG. 7 is a right side view of the engine auxiliary unit 24. The engine auxiliary unit 24 has a fuel filter 31, a crank case ventilation device 32 (referred to below as "CCV 32"), an engine control unit (referred to below as "ECU 33"), and a bracket 34.

As illustrated in FIG. 2 and FIG. 6, the fuel filter 31 is connected to a fuel tank (which is not shown in the diagram) via a first fuel pipe 311. That is, the first fuel pipe 311 is an example of a connecting member which connects the engine 21 and the fuel filter 31. The fuel filter 31 is connected to a fuel supply device in the engine 21 via a second fuel pipe 312. The fuel filter 31 filters the fuel which is sent from the fuel tank to the engine 21.

As shown in FIG. 3 and FIG. 5, the CCV 32 is connected to a blowby gas outlet of the engine 21 via a blowby gas pipe 321. The CCV 32 is connected to an air suction pipe in the engine 21 via an air return pipe 322. That is, the blowby gas pipe 321 and the air return pipe 322 are examples of connecting members which connect the engine 21 and the CCV 32. The blowby gas inside the engine 21 flows to the CCV 32 through the blowby gas pipe 321. The CCV 32 separates the blowby gas into liquid which includes fuel and oil and air. The air which was separated in the CCV 32 is returned to the air suction pipe of the engine 21 through the air return pipe 322.

The ECU 33 includes a computation device such as a CPU and a memory such as a RAM or a ROM. The ECU 33 stores programs and data for controlling the engine 21 and controls the engine 21. The ECU 33 is connected to the fuel injection device of the engine 21 via a first electric cable which is not shown in the diagram. The first electric cable is an example of a connecting member which connects the ECU 33 and the engine 21. In addition, the ECU 33 is connected to a pump controller (which is shown in the diagram) which controls the hydraulic pumps 221 to 223 via a second electric cable which is not shown in the diagram.

The fuel filter 31, the CCV 32, and the ECU 33 are attached to the engine 21 via the bracket 34. The bracket 34 is disposed above the flywheel 23. The bracket 34 is attached to the flywheel 23. The bracket 34 has a plate section 341, a first side surface section 342, a second side surface section 343, and a base surface section 345.

The plate section 341 has a shape which extends in the up and down direction and the right and left directions. The first side surface section 342 is connected to one side section of the plate section 341. The second side surface section 343 is connected to the other side section of the plate section 341. Specifically, the first side surface section 342 is connected to the left side section of the plate section 341. The second side surface section 343 is connected to the right side surface section of the plate section 341.

The fuel filter 31 is attached to the first side surface section 342. The CCV 32 is attached to the second side surface section 343. The ECU 33 is attached to the plate section 341. The ECU 33 is attached to the bracket 34 in between the fuel filter 31 and the CCV 32. Accordingly, the fuel filter 31, the ECU 33, and the CCV 32 are disposed to line up in the left and right direction. Here, as shown in FIG. 4, the ECU 33 is attached to the plate section 341 via an elastic member 35.

The base surface section 345 is connected to the lower end of the plate section 341. The base surface section 345 has a shape which extends in the left and right direction and the front and back direction. As shown in FIG. 6 and FIG. 7, the plate section 341 and the base surface section 345 have a shape with an L shape which is bent between the plate section 341 and the base surface section 345. The base surface section 345 is disposed along the upper surface of the flywheel 23 and is attached to the flywheel 23.

The engine auxiliary unit 24 further has a linking member 36. The linking member 36 has an elongated shape which extends in the front and back direction. The linking member 36 links the upper portion of the bracket 34 and the engine 21. Specifically, as shown in FIG. 7, an attachment section 346 is provided in the front surface of the plate section 341. One end of the linking member 36 is attached to the attachment section 346. As shown in FIG. 2 and FIG. 3, the other end of the linking member 36 is attached to a support member 251 of an exhaust treatment device 25. The exhaust treatment device 25 and the support member 251 are disposed above the front portion of the engine 21. The exhaust treatment device 25 is attached to the engine 21 via the support member 251.

Figure 8:
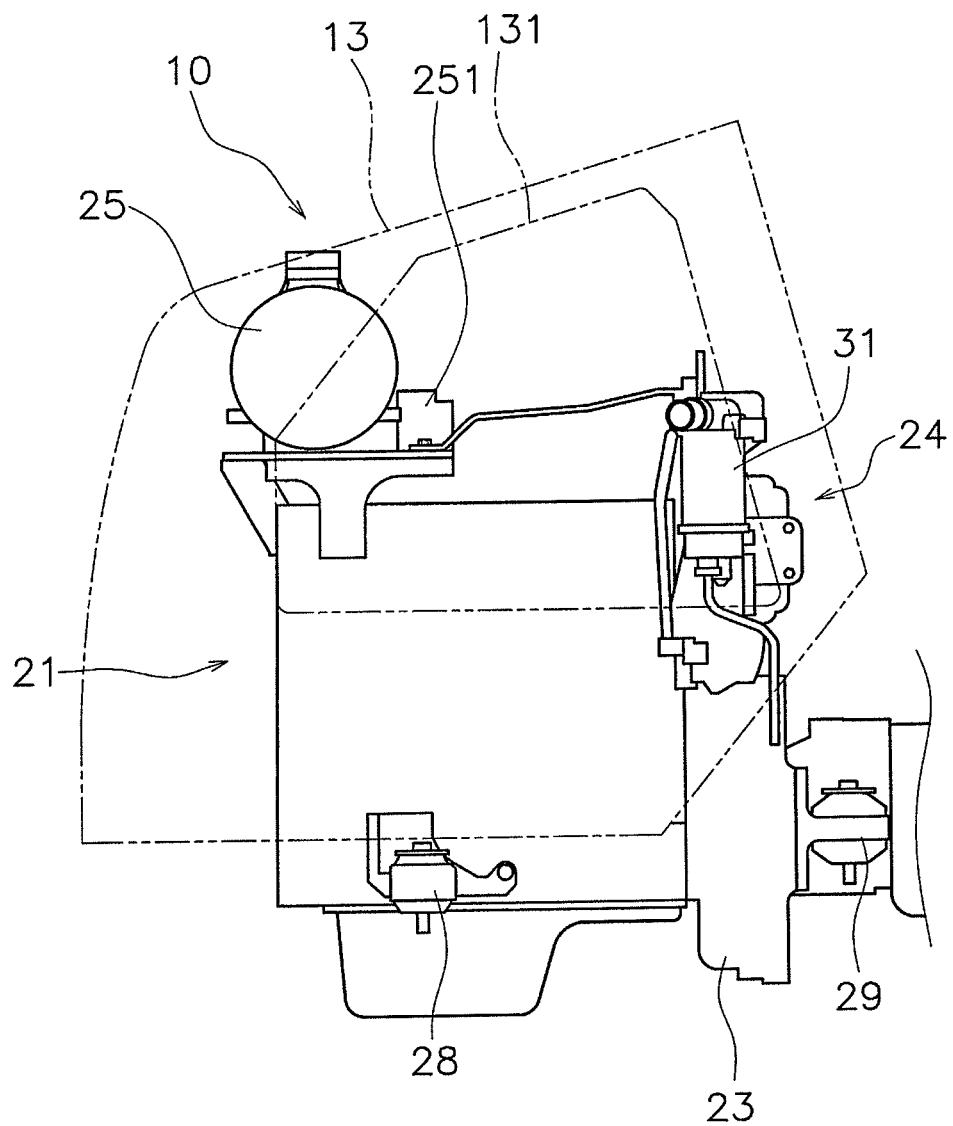
FIG. 8 is a left side view where a front portion of the engine unit has been enlarged.

FIG. 8 is a left side view where a front portion of the engine unit 10 has been enlarged. FIG. 8 shows the position of the engine cover 13 with a two dot chain line. As shown in FIG. 8, a left inspection window 131 is provided on the left side surface of engine cover 13. The fuel filter 31 is disposed to overlap with the left inspection window 131 in a side surface view. In other words, the fuel filter 31 is disposed to face the left inspection window 131.

Figure 9:
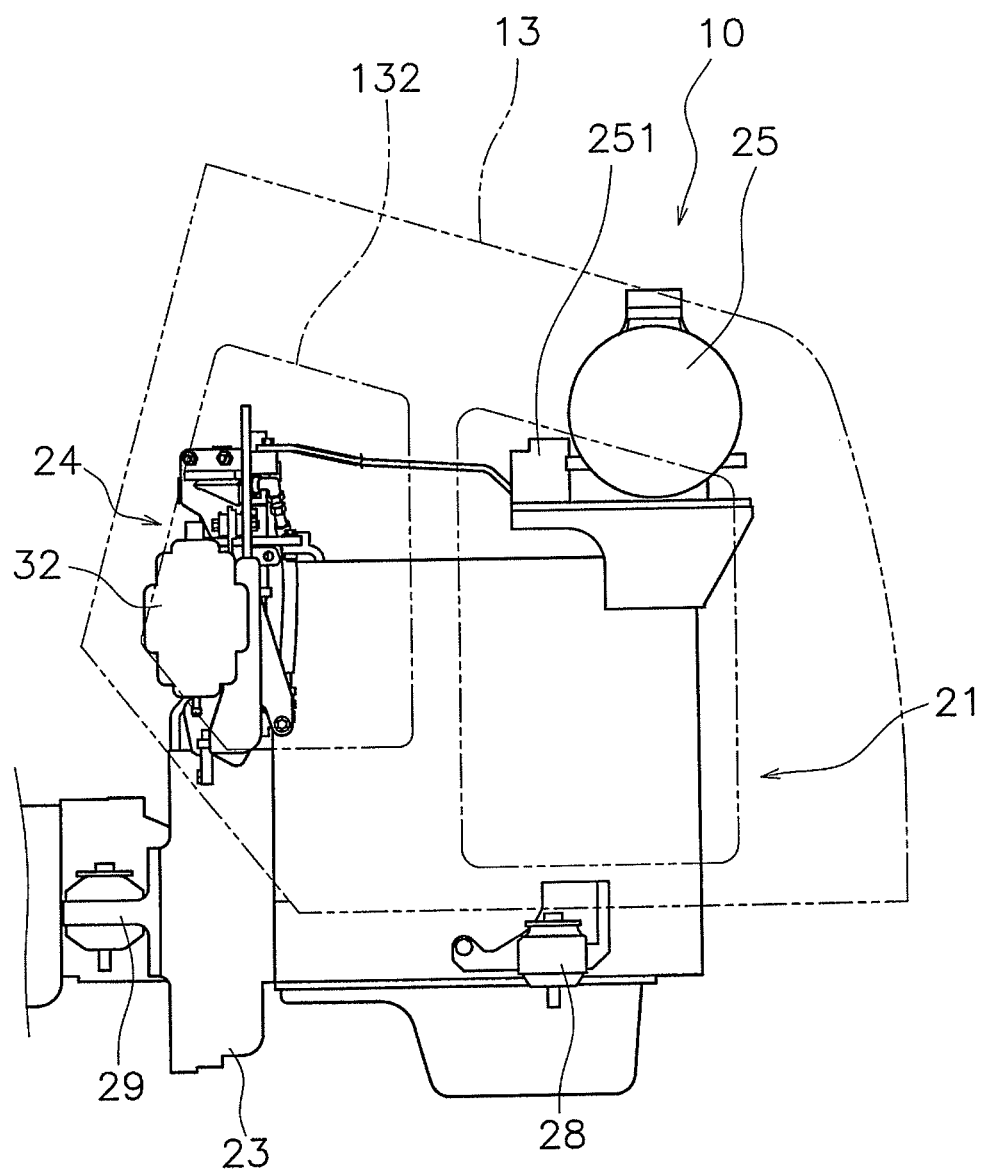
FIG. 9 is a right side view where a front portion of the engine unit has been enlarged.

FIG. 9 is a right side view where a front portion of the engine unit 10 has been enlarged. FIG. 9 shows the position of the engine cover 13 with a two dot chain line. As shown in FIG. 9, a right inspection window 132 is provided on the right side surface of engine cover 13. The CCV 32 is disposed to overlap with the right inspection window 132 in a side surface view. In other words, the CCV 32 is disposed to face the right inspection window 132.

In the bulldozer 1 according to the present embodiment, the fuel filter 31, the ECU 33, and the CCV 32 (referred to below together as "engine auxiliaries 31 to 33") are mounted to the engine 21. As a result, the engine auxiliaries 31 to 33 belong to the same vibration system as the engine 21.

In addition, since the pump assembly 22 is connected in the rear portion of the engine 21, as shown in FIG. 2, a center of gravity G1 of the engine unit 10 is positioned behind a center of gravity G2 of the engine 21 itself. Here, in the bulldozer 1 according to the present embodiment, the engine auxiliaries 31 to 33 are disposed behind the engine 21. As a result, compared to a case where the engine auxiliaries 31 to 33 are disposed in front of the engine 21, the distance between the center of gravity G1 of the engine unit 10 and the engine auxiliaries 31 to 33 is shortened. Due to this, it is possible to reduce the burden on the connecting member which connects the engine 21 and the engine auxiliaries 31 to 33. That is, it is possible to reduce the burden on the first fuel pipe 311 which connects the fuel filter 31 and the engine 21. In addition, it is possible to reduce the burden on the first electric cable which connects the ECU 33 and the engine 21. In addition, it is possible to reduce the burden on the blowby gas pipe 321 and the air return pipe 322 which connect the CCV 32 and the engine 21.

The engine auxiliaries 31 to 33 are disposed above the flywheel 23. Due to this, it is possible for the engine 21, the engine auxiliaries 31 to 33, and the flywheel 23 to be disposed in a compact manner.

The engine auxiliaries 31 to 33 are mounted to the engine 21 via the bracket 34. As a result, it is possible to realize the structure where the engine auxiliaries 31 to 33 are disposed behind the engine 21 and the engine auxiliaries 31 to 33 are mounted to the engine 21 using the bracket 34.

The upper portion of the bracket 34 is connected to the engine 21 using the linking member 36. Due to this, since the difference in vibration between the engine auxiliary unit 24 and the engine 21 is reduced, it is possible to further reduce the burden of the connecting member.

The fuel filter 31 is disposed to face the left inspection window 131. As a result, it is possible to easily access the fuel filter 31 from the left inspection window 131. Due to this, the ease of carrying out maintenance on the fuel filter 31 is improved.

The CCV 32 is disposed to face the right inspection window 132. As a result, it is possible to easily access the CCV 32 from the right inspection window 132. Due to this, the ease of carrying out maintenance on the CCV 32 is improved.

Above, an embodiment of the present invention has been described, but the present invention is not limited to the embodiment described above and various modifications are possible within the scope which does not depart from the gist of the invention.

The engine auxiliaries are not limited to the fuel filter 31, the ECU 33, and the CCV 32 and may include a portion of these. Alternatively, the engine auxiliaries may further include devices other than the fuel filter 31, the ECU 33, and the CCV 32. Alternatively, the engine auxiliaries may include devices which are different to the fuel filter 31, the ECU 33, and the CCV 32.

The engine auxiliaries 31 to 33 do not need to be a unit using the bracket 34. That is, each of the plurality of engine auxiliaries 31 to 33 may each be individually mounted to the engine 21.

The engine auxiliary unit 24 may be mounted to the engine 21 without the flywheel 23. For example, the engine auxiliary unit 24 may be attached directly to the engine 21. Alternatively, the engine auxiliary unit 24 may be attached to the pump assembly 22.

The upper portion of the bracket 34 does not need to be connected to the engine 21 via the linking member 36. Here, in order to further reduce the difference in vibration between the engine auxiliary unit 24 and the engine 21, it is preferable that the upper portion of the bracket 34 be connected to the engine 21 via the linking member 36 as in the embodiment described above.

The shape of the bracket 34 is not limited to the shape in the embodiment described above and may be changed as appropriate.

At least one of the right inspection window 132 and the left inspection window 131 may be omitted. Here, since CCV 32 normally requires regular maintenance, it is preferable for the inspection window to be disposed to face the CCV 32.

According to the present invention, it is possible to provide a bulldozer where it is possible to reduce the burden on a connecting member which connects an engine auxiliary and an engine.

The invention claimed is:

1. A bulldozer comprising:
    an engine having an output axis which extends in a front and back direction of the bulldozer, the engine further having a flywheel;
    a pump assembly connected to the engine, and including a plurality of hydraulic pumps, the hydraulic pumps being disposed behind the engine and line up with each other in the front and back direction, the pump assembly connected to the engine via the flywheel which is disposed in front of the pump assembly;

an engine auxiliary disposed behind the engine above the flywheel and being mounted to the engine, the engine auxiliary having a fuel filter and a crank case ventilation device;

a connecting member connecting the engine and the engine auxiliary; and a bracket to which the engine auxiliary is attached, the bracket being disposed above the flywheel and attached to the flywheel, with the fuel filter of the engine auxiliary being attached to one side portion of the bracket and the crank case ventilation device of the engine auxiliary being attached to the other side portion of the bracket.

2. The bulldozer according to claim 1, further comprising:
a linking member linking an upper portion of the bracket and the engine.

3. The bulldozer according to claim 1, wherein
the engine auxiliary further has an engine control unit which is attached to the bracket between the fuel filter and the crank case ventilation device.

4. The bulldozer according to claim 3, wherein
the bracket includes a plate section which extends in the up and down direction and in the left and right direction and to which the engine control unit is attached, a first side surface section which is linked to one side portion of the plate section and to which the fuel filter is attached, a second side surface section which is linked to the other side portion of the plate section and to which the crank case ventilation device is attached, and a base surface section to which the flywheel is attached.

5. The bulldozer according to claim 1, further comprising:
an engine cover for covering the engine, and
an inspection window provided in a side surface of the engine cover, and the engine auxiliary being disposed to face the inspection window.

6. The bulldozer according to claim 2, further comprising:
an engine cover for covering the engine, and
an inspection window provided in a side surface of the engine cover, and the engine auxiliary being disposed to face the inspection window.

7. The bulldozer according to claim 3, further comprising:
an engine cover for covering the engine, and
an inspection window provided in a side surface of the engine cover, and the engine auxiliary being disposed to face the inspection window.

8. The bulldozer according to claim 4, further comprising:
an engine cover for covering the engine, and
an inspection window provided in a side surface of the engine cover, and the engine auxiliary being disposed to face the inspection window.

* * * * *